3,187,511
MULTIPLE ELEMENT HYDROKINETIC TORQUE
CONVERTER MECHANISM
Martin G. Gabriel, Dearborn, Mich., assignor to Ford
Motor Company, Dearborn, Mich., a corporation of
Delaware
Filed May 22, 1963, Ser. No. 282,469
5 Claims. (Cl. 60—54)

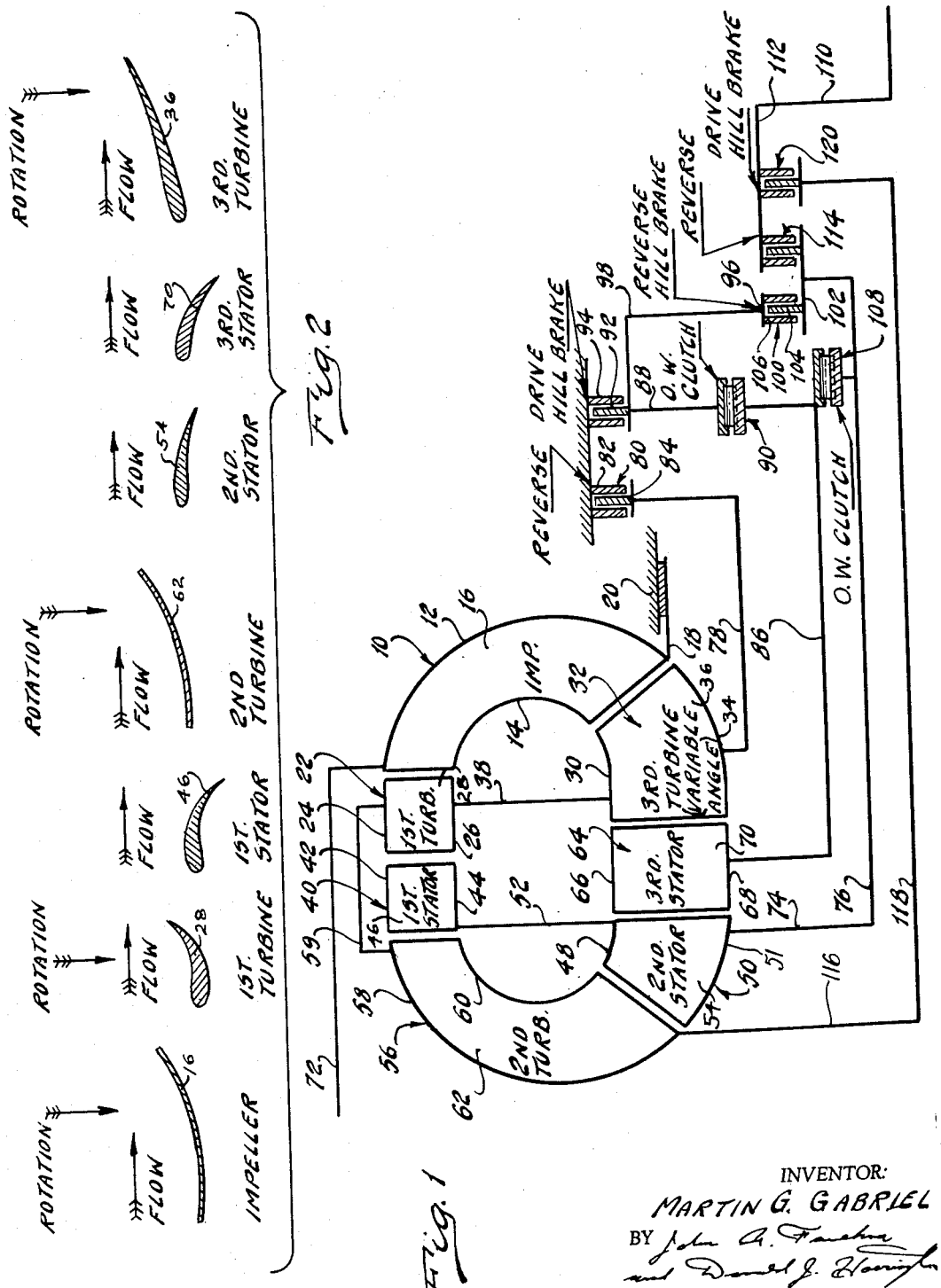

My invention relates generally to hydrokinetic torque converter mechanisms, and more particularly to an improved torque converter having plural turbine members and plural stator members situated in a common torus circuit.

It is an object of my invention to provide a torque converter of this type wherein provision is made for connecting in driving relationship each of the multiple turbines in the hydrokinetic unit for common torque delivery. I contemplate that such a turbine arrangement in a hydrokinetic unit of this type will provide a higher degree of torque multiplication throughout any given speed ratio range. This, of course, results in an increased over-all operating efficiency.

It is another object of my invention to provide a multiple element torque converter unit of the type above set forth wherein multiple stator members are situated strategically in the torus circuit and wherein provision is made for transferring the reaction torque of the stator members through a compound over-running clutch arrangement and a friction disc brake to a relatively stationary transmission housing.

It is another object of my invention to provide a multiple element torque converter having multiple stators wherein one of the stators is situated adjacent the inlet section of one of several turbine members in the torus circuit, and wherein provision is made for transferring the reaction torque of this stator to the stationary transmission housing during forward torque delivery and for transmitting driving torque to the power output shaft during reverse drive operation.

It is another object of my invention to provide a mechanism of the type set forth in the foregoing paragraph wherein provision is made also for transferring the reaction torque of the other stators to the transmission housing through an overrunning clutch arrangement that is common to the first stator and wherein provision is also made for transmitting the combined torque of all of the turbines to the driven shaft during reverse drive operation.

For the purpose of describing more particularly the improvements of my invention, reference will be made to the accompanying drawings wherein:

FIGURE 1 is a schematic representation of a hydrokinetic torque converter and clutch and brake arrangement embodying the features of my invention; and FIGURE 2 is a schematic blade cascade diagram showing the relative blade geometry for the various blade elements of the mechanism of FIGURE 1.

Referring first to FIGURE 1, the hydrokinetic torque converter impeller is indicated generally by reference character 10. It includes an outer shroud 12 and an inner shroud 14. Impeller blades 16 are situated between the shrouds and define radial flow passages.

The hub portion of the shroud 12 can be connected to a sleeve shaft 18 which may be journaled within an opening formed in the stationary transmission housing in a conventional fashion. The housing is indicated generally by reference character 20.

A first turbine is designated by reference character 22. It includes an outer shroud 24 and an inner shroud 26 between which are situated blade elements 28. These elements form a continuation of the flow passages defined by the impeller blade elements 16.

Inner shroud 26 is connected to a first shroud 30 of a third turbine 32. Turbine 32 includes also a second shroud 34, and blade elements 36 are situated between the shrouds 30 and 34. The connection between shrouds 26 and 30 may be formed by a radially extending web member 38 which is situated within the inner torus region of the converter unit. If desired, the angularity of the blade elements 36 can be made variable to compensate for changes in the direction of the absolute fluid flow velocity vector at that location in the torus circuit.

Situated adjacent the exit section of the first turbine is a first stator generally indicated by reference character 40. It includes a first shroud 42, a second shroud 44 and circumferentially spaced blade elements 46 which form a continuation of the flow passages defined by the blade elements 28 of the first turbine.

Shroud 44 is connected to a first shroud 48 of a second stator 50 which is located at a radially inward region of the torus circuit. This connection is provided by a second web member 52 located within the inner torus region of the unit.

Second stator blade elements 54 are situated between the shrouds 48 and 51.

A second turbine 56 is situated in the radial inflow region of the torus circuit and functions to establish a toroidal fluid flow path from the first stator exit section to the second stator inlet section. It includes an outer shroud 58 and an inner shroud 60 between which are situated a plurality of circumferentially spaced turbine blades 62.

The first turbine 22 is connected drivably to the second turbine 52 through a torque transfer member 59 which interconects the shrouds 24 and 58.

A third stator is located between the exit section of the second stator and the entrance section of the third turbine. It is designated generally by reference character 64. It includes a first shroud 66, a second shroud 68 and stator blade elements 70 located between the shrouds 66 and 68.

Driving torque is delivered to the impeller 10 by means of a drive shell 72 that is connected as indicated to the outer shroud 12. Shell 72 in turn can be connected to an engine driven crankshaft for an internal combustion vehicle engine or to some other suitable power source. When the impeller is driven, toroidal fluid flow circulation in the torus circuit is established in the conventional fashion. This flow is designated generally by the horizontal velocity vector shown in FIGURE 2. Shown also in FIGURE 2 is an unwrapped cascade view of the blade elements of the torque converter unit. The direction of rotation of the impeller is indicated schematically in FIGURE 2 by the vertical velocity vector.

As the fluid passes from the exit section of the impeller through the blading 28 of the first turbine, a change in the tangential component of the absolute fluid flow vector will take place. This causes a torque reaction upon the first turbine. It tends to rotate the first turbine in the direction of rotation of the impeller.

Since a change in the moment of momentum takes place during the transition of the flow from the entrance section of the first turbine to the exit section thereof, the direction of the tangential component of the absolute fluid flow velocity vector at the exit section of the first turbine must be redirected in order to make the vector favorable for development of torque in the second turbine stage. This redirection of the fluid flow is accomplished by the first stator. Thus, the exit flow velocity vector at the exit section of the first stator will result in a change in the moment of momentum of the fluid as it passes through the second turbine.

The tangential component of the absolute fluid flow velocity vector at the exit section of the second turbine must be redirected again before the entrance angle for the third turbine will be favorable for torque delivery. This redirection of flow is accomplished with the second stator and the third stator acting in series relationship. In this way a relatively high degree of torque ratio carryout throughout the speed ratio range may be achieved.

The torque of the first stator is transmitted directly through the blading of the second stator to a stationary hub element 74, which in turn is connected to a sleeve shaft 76. It is not necessary, therefore, to provide spokes that extend through the flow region of the torus circuit as in certain prior art arrangements to transfer torque from a radially outward stator member to the stator shaft.

After a predetermined speed ratio is reached, the direction of the fluid flow velocity vector in the torus circuit changes to produce a tangential component which will cause the first stator and second stator to freewheel. The freewheeling clutch structure will be described seubsequently. The blading of the third stator can be designed so that it will freewheel at a higher speed ratio than the speed ratio at which the first and second stators freewheel. This stator arrangement provides improved over-all efficiency and torque multiplication carryout.

A third turbine is connected to a sleeve shaft 78 that is journalled within the housing 20. Sleeve shaft 78 is connected to housing 20 by means of a selectively engageable friction brake 80 having first friction elements 82. These elements 82 are carried by the housing. The brake includes also at least one other friction element 84 that is carried by and connected to the sleeve shaft 78. Suitable fluid pressure operated servos can be employed for urging the elements 82 into frictional engagement.

The third stator is connected to another sleeve 86. This sleeve shaft in turn is connected to a torque delivery member 88 through an overrunning clutch 90. This clutch will permit torque to be delivered from shaft 86 to element 88 in one direction, but is incapable of delivering torque in the opposite direction. Clutch 90 can be of a conventional roller clutch design or a sprag clutch design, both of which are well known in the art.

Element 88 carries a friction member 92 which is situated between friction members 94 that in turn are connected to the housing 20 and held fast. Like the brake 80, the brake of which members 92 and 94 form a part may be engaged by means of a suitable fluid pressure operated servo in a conventional fashion.

Element 88 is connected to a clutch element 96 through a torque delivery member 98. Element 96 forms a part of a first clutch 100. This clutch includes also a second element 102 which carries a friction member 104. This member is adapted to be clutched in frictional driving relationship with respect to another friction member 106 carried by element 96. Sleeve shaft 76 is connected to clutch element 102. Shaft 76 is connected also to sleeve shaft 86 and to the inner race of one-way clutch 90 through a second one-way clutch 108.

A driven shaft, shown at 110, is connected to a drum 112. Shaft 76 can be connected to drum 112 through another selectively engageable friction clutch 114.

The second turbine includes a hub 116 which is connected to a central turbine shaft 118. As indicated, shaft 118 in turn may be connected selectively to drum 112 and driven shaft 110 through a selectively engageable friction clutch 120.

During operation in the forward drive range, the selectively engageable brake shown at 92 and 94 is applied. This anchors the outer race for the one-way clutch 90. Thus, the torque reaction of the third stator can be distributed through sleeve shaft 86, through one-way clutch 90 and finally through the drive range to the housing 20. In a similar fashion, the torque reaction of the first stator and the second stator is distributed through sleeve shaft 76 and through each of the one-way clutches 108 and 90.

It is distributed then to the housing 20 through the drive brake.

Selectively engageable clutch 120 is engaged during forward drive operation. It thus is capable of delivering the combined torques of each of the three turbines, the torque of one turbine augmenting the torque of the other.

As previously explained, the first and second clutch points will occur as the first and second stators freewheel and the third stator freewheels, respectively. Thereafter, the unit will operate as a coupling in the usual fashion.

Reverse drive is obtained by releasing the clutch 120 and by engaging the reverse brake 80. This anchors each of the three turbines. The drive brake shown at 92 and 94 is released. Thus, the combined torque of each of the stators is distributed to element 98. The reverse brakes 100 and 114 are engaged and the combined stator torque is distributed through clutch 100 to element 102. It then is distributed through clutch 114 to the drum 112. This torque, however, is in a direction that is opposite to the direction of the driving torque applied to the impeller 10.

It is possible to obtain hill braking by engaging clutch 120 to permit the shaft 110 to drive the turbine 56, which sets up a reverse toroidal fluid flow. The first and second stators can be used to augment the braking capacity of the unit by engaging simultaneously brake 100 and the brakes shown at 92 and 94. Although the one-way clutches are incapable of delivering braking torque from the stators under hill braking conditions, this torque can be distributed through the friction clutch 100 and through the brake 92, 94 to the housing.

Having thus described a preferred embodiment of my invention, what I claim and desire to secure by U.S. Letters Patent is:

1. A hydrokinetic torque converter transmission mechanism adapted to deliver driving torque from a driving member to a driven member and comprising an impeller connected to said driving member, a first turbine, a first stator, a second turbine, a second stator, a third turbine and a third stator situated in toroidal fluid flow relationship in a common torus circuit, said impeller being located at a radial outflow region of said circuit, said second turbine being located at a radial inflow region of said circuit, said first stator and said first turbine being located at a radially outward region of said circuit and being adapted to accommodate axial flow, said second stator, said third stator and said third turbine being located at a radially inward region of said circuit, said turbines being connected together for rotation in unison, said first stator and said second stator being connected together for rotation in unison, a turbine shaft, first selectively engageable clutch means for connecting said turbine shaft to said driven member, a first stator shaft connected to said second stator, a second stator shaft connected to said third stator, a selectively engageable forward drive brake including a friction member, means for selectively anchoring said friction member to a stationary portion of said mechanism, first one-way clutch means for connecting said second stator shaft to said friction member, second one-way clutch means for connecting said first stator shaft to said friction member through said first one-way clutch means, and second selectively engageable clutch means for connecting said first stator shaft to said friction member to inhibit rotation of said first stator and said second stator against rotation in either direction when said second turbine overruns said impeller and said friction member is anchored.

2. A hydrokinetic torque converter transmission mechanism adapted to deliver driving torque from a driving member to a driven member and comprising an impeller connected to said driving member, a first turbine, a first stator, a second turbine and a second stator situated in toroidal fluid flow relationship in a common torus circuit, said impeller being located at a radial outflow region of said circuit, said second turbine being located at a radial inflow region of said circuit, said first stator and said first turbine being located at a radially outward region of said circuit and being adapted to accommodate axial flow, said second stator being located at a radially inward region of said circuit, said turbines being connected together for rotation in unison, a turbine shaft, first selectively engageable clutch means for connecting said turbine shaft to said driven member, a first stator shaft connected to said first stator, a second stator shaft connected to said second stator, a selectively engageable forward drive brake including a friction member, means for selectively anchoring said friction member to a stationary portion of said mechanism, first one-way clutch means for connecting said second stator shaft to said friction member, second one-way clutch means forming in part a connection between said first stator shaft and said friction member through said first one-way clutch means, second selectively engageable clutch means for connecting said first stator shaft to said friction member to inhibit rotation of said first stator against rotation in either direction when said second turbine overruns said impeller, reverse brake means for anchoring said turbines against rotation during reverse drive operation, and third selectively engageable clutch means for connecting said first stator shaft to said driven member during reverse drive operation.

3. A hydrokinetic torque converter transmission mechanism adapted to deliver driving torque from a driving member to a driven member and comprising an impeller connected to said driving member, a first turbine, a first stator, a second turbine, a second stator, a third turbine and a third stator situated in toroidal fluid flow relationship in a common torus circuit, said impeller being located at a radial outflow region of said circuit, said second turbine being located at a radial inflow region of said circuit, said first stator and said first turbine being located at a radially outward region of said circuit and being adapted to accommodate axial flow, said second stator, said third stator and said third turbine being located at a radially inward region of said circuit said turbines being connected together for rotation in unison, said first stator and said second stator being connected together for rotation in unison, a turbine shaft, first selectively engageable clutch means for connecting said turbine shaft to said driven member, a first stator shaft connected to said second stator, a second stator shaft connected to said third stator, a selectively engageable forward drive brake including a friction member, means for selectively anchoring said friction member to a stationary portion of said mechanism, first one-way clutch means for connecting said second stator shaft to said friction member, second one-way clutch means for connecting said first stator shaft to said friction member through said first one-way clutch means, second selectively engageable clutch means for connecting said first stator shaft to said friction member to inhibit rotation of said first stator and said second stator against rotation in either direction when said second turbine overruns said impeller, reverse brake means for anchoring said turbines against rotation during reverse drive operation, third selectively engageable clutch means for connecting said first stator shaft to said driven member during reverse drive operation, said second selectively engageable clutch means being applied during reverse drive operation whereby the torque acting upon said third stator supplements the torque acting upon said first stator and the torque acting upon said second stator.

4. A hydrokinetic torque converter transmission mechanism adapted to deliver driving torque from a driving member to a driven member and comprising an impeller connected to said driving member, a first turbine, a first stator, a second turbine and a second stator situated in toroidal fluid flow relationship in a common torus circuit, said impeller being located at a radial outflow region of said circuit, said second turbine being located at a radial inflow region of said circuit, said first stator and said first turbine being located at a radially outward region of said circuit and being adapted to accommodate axial flow, said second stator being located at a radially inward region of said circuit, said turbines being connected together for rotation in unison, a turbine shaft, first selectively engageable clutch means for connecting said turbine shaft to said driven member, a first stator shaft connected to said first stator, a second stator shaft connected to said second stator, a selectively engageable forward drive brake including a friction member, means for selectively anchoring said friction member to a stationary portion of said mechanism, first one-way clutch means for connecting said second stator shaft to said friction member, second one-way clutch means forming in part a connection between said first stator shaft and said friction member, second selectively engageable clutch means for connecting said first stator shaft to said friction member to inhibit rotation of said first stator against rotation in either direction when said second turbine overruns said impeller, reverse brake means for anchoring said turbines against rotation during reverse drive operation, and third selectively engageable clutch means for connecting said first stator shaft to said driven member during reverse drive operation.

5. A hydrokinetic torque converter transmission mechanism adapted to deliver driving torque from a driving member to a driven member and comprising an impeller connected to said driving member, a first turbine, a first stator, a second turbine, a second stator, a third turbine and a third stator situated in toroidal fluid flow relationship in a common torus circuit, said impeller being located at a radial outflow region of said circuit, said second turbine being located at a radial inflow region of said circuit, said first stator and said first turbine being located at a radially outward region of said circuit and being adapted to accommodate axial flow, said second stator, said third stator and said third turbine being located at a radially inward region of said circuit, said turbines being connected together for rotation in unison, said first stator and said second stator being connected together for rotation in unison, a turbine shaft, first selectively engageable clutch means for connecting said turbine shaft to said driven member, a first stator shaft connected to said third stator, a second stator shaft connected to said second stator, a selectively engageable forward drive brake including a friction member, means for selectively anchoring said friction member to a stationary portion of said mechanism, first one-way clutch means for connecting said first stator shaft to said friction member, second one-way clutch means forming in part a connection between said second stator shaft and said friction member, second selectively engageable clutch means for connecting said second stator shaft to said friction member to inhibit rotation of said first stator and said second stator against rotation in either direction when said second turbine overruns said impeller, reverse brake means for anchoring said turbines against rotation during reverse drive operation, third selectively engageable clutch means for connecting said second stator shaft to said driven member during reverse drive operation, said second selectively engageable clutch means being applied during reverse drive operation whereby torque acting upon said third stator supplements the torque acting upon said first stator and the torque acting upon said second stator.

References Cited by the Examiner
UNITED STATES PATENTS

| | | | |
|---|---|---|---|
| 2,762,196 | 9/56 | Ullery | 60—54 |
| 2,762,197 | 9/56 | Ullery | 60—54 |
| 3,090,252 | 5/63 | Mamo | 60—54 X |

JULIUS E. WEST, *Primary Examiner.*